G. E. YOUNG.
HOSE COUPLING.
APPLICATION FILED DEC. 24, 1915.
1,186,722.
Patented June 13, 1916.
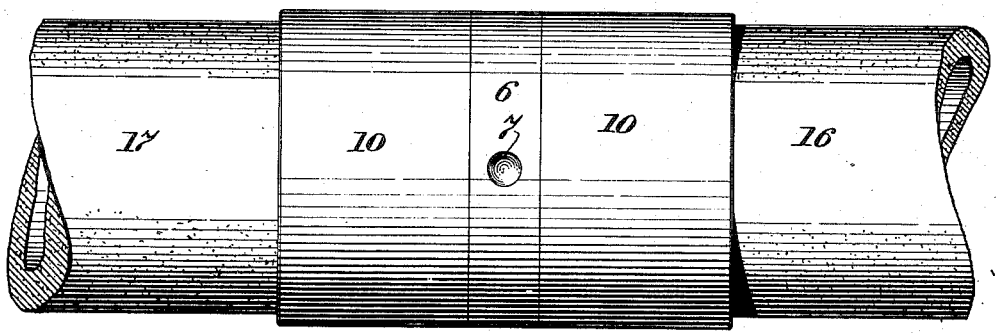
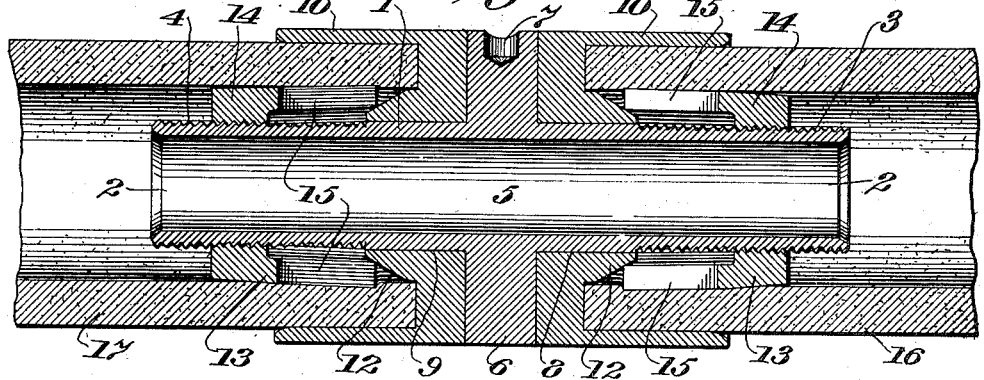
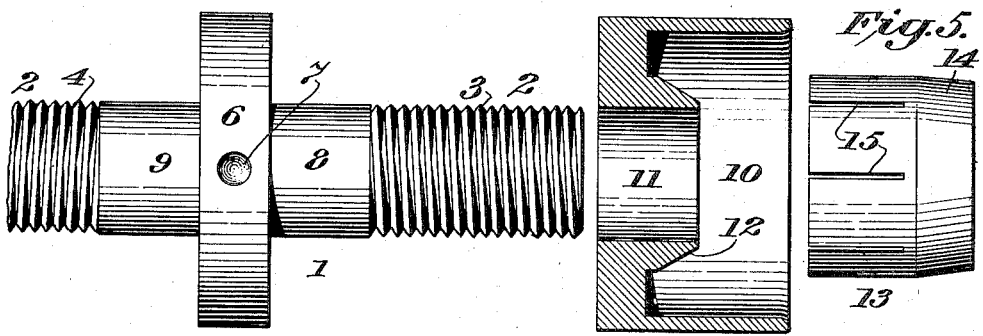
Inventor
George E. Young
by
W. H. Finckel
Attorney

UNITED STATES PATENT OFFICE.

GEORGE E. YOUNG, OF WATERBURY, CONNECTICUT.

HOSE-COUPLING.

1,186,722.  Specification of Letters Patent.  Patented June 13, 1916.

Application filed December 24, 1915. Serial No. 68,491.

*To all whom it may concern:*

Be it known that I, GEORGE E. YOUNG, a citizen of the United States, residing at Waterbury, in the county of New Haven and State of Connecticut, have invented a certain new and useful Improvement in Hose-Couplings, of which the following is a full, clear, and exact description.

The object of this invention is to provide a simple, efficient and economical device for coupling lengths or sections of tubular objects, and particularly hose. Devices of this type are commonly designated "hose-couplings," and I have herein used this designation for my invention, but without thereby limiting its applicability or uses.

The invention consists of a tubular core, having its opposite ends screwthreaded and a dividing collar which is adapted to receive a wrench or spanner or other turning implement, the screwthreads on the opposite ends preferably being right and left handed, so that as the core is turned those parts presently mentioned will be run on or off the core. On the collar and surrounding the screwthreaded ends are loosely fitted cups, and in the bottoms of these cups are tapered or conical outwardly extending flanges, and fitted within the cups and engaging the screwthreaded ends of the core are expansion nuts between which and the outer walls of the cups the ends of the sections to be coupled are placed, and then by turning the core the nuts are run or screwed down upon the tapered flanges and said nuts are expanded and thereby firmly clamp the ends of the sections between themselves and the cups, as I will proceed now to explain and finally claim.

In the accompanying drawings illustrating the invention, in the several figures of which like parts are similarly designated, Figure 1 is an elevation of two sections of hose coupled together with the device of this invention. Fig. 2 is a vertical longitudinal section of the parts shown in Fig. 1. Fig. 3 is an elevation of the core with the left-hand screw threaded end broken off. Fig. 4 is a longitudinal section of one of the cups. Fig. 5 is an elevation of one of the expansion nuts.

The core 1 has ends 2 which are externally screwthreaded at 3 and 4, preferably right and left-handed, respectively, and a central tubular opening 5 extends throughout the entire length of the core. The core has a central dividing collar 6, which may be provided with any suitable means, such as a socket 7 to be engaged by a spanner wrench or other means to turn the core.

The core is left unthreaded as at 8 and 9 for a certain distance upon each side of the dividing collar 6 and adjacent to the screwthreads 3 and 4 to form slip fit bearings for identical, interchangeable cups 10 having bearings 11 to engage the bearings 8 and 9 of the core, and these cups also have the tapered or conical outwardly extending flanges 12 adapted to coact with nuts 13 having the externally tapered and interiorly screwthreaded portions 14 by which they may be applied to the screwthreaded ends of the core, and longitudinal slits 15 which permit of their lateral expansion when they are screwed down upon the conical flanges 12 of the cups 10.

The coupling is applied by slipping the cups 10 upon the ends of the core so that they abut against the collar 6, and turn freely upon the bearings 8 and 9 respectively. Then an expansion nut 13 is placed in the end of each of the sections of hose 16 and 17 respectively and its thread engaged with and started upon the screwthreads 3 and 4 of the ends 2 of the core. The external tapering of the end portion 14 of the nuts facilitates the insertion of these nuts in the hose sections. Then a wrench or other suitable tool or implement is applied to the collar 6 and it is turned in the proper direction to draw the two ends of the hose into the cups by means of the nuts 13 and threaded ends 2 of the core, the right-hand and left-hand threads acting to draw the two ends together simultaneously. This drawing together of the ends of the hose causes them to enter the cups and also brings the nuts 13 into operative engagement with the tapered or conical flanges 12 and causes said nuts to expand, thereby securely clamping the hose ends between the nuts 13 and the longitudinal walls of the cups 10. It is obvious that by turning the core in the opposite direction, the parts may be released. Thus this coupling not only provides for the ready and efficient union of sections of hose and the like, but it also admits of the ready uncoupling thereof, so that it may be used over and over again.

The tubular opening 5 permits the free passage of whatever fluid the hose is adapted to convey.

Variations in details of construction and arrangement of the parts are contemplated as within the scope and intent of the claims following, as for example, the coupling may be used for one instead of two sections of hose and the like.

What I claim is:—

1. A hose coupling, comprising a screwthreaded core, cups fitted upon said core, nuts adapted to be screwed onto said core, and means in said cups for expanding said nuts to clamp hose ends between them and said cups.

2. A hose coupling, comprising a core, cups applied to said core, expansible means applicable to the hose and means in said cups adapted to coact with and expand the expansible means to thereby connect the hose and coupling.

3. A hose coupling, comprising a screwthreaded core having a collar, cups fitted on said core and against said collar, expansion nuts adapted for application to a hose and to said screwthreaded core, and cones in said cups for expanding said nuts to clamp the hose between said nuts and said cups.

4. A hose coupling, comprising a tubular core having right-hand and left-hand screwthreads, bearings on said core, cups having conical flanges applied to said bearings, expansion nuts adapted to engage the screwthreads of said core to clamp a hose between said nuts and cups, and means on said collar whereby said core may be turned to draw said nuts, flanges, hose and cups into clamping relation.

5. A hose coupling, having a longitudinally hollow core provided with externally screwthreaded ends and an intermediate collar, cups loosely applied to the core on opposite sides of the collar and having interior cones at their bases, and expansion nuts adapted to be inserted in the ends of sections of hose and to be engaged with the screwthreaded ends of the core and the cones in the cups to clamp the hose sections between themselves and the longitudinal walls of the cups by rotation of the core.

6. The combination of a tubular core having a screwthreaded end and a collar arranged adjacent to the screwtheads, a cup loosely applied to the core and abutting the collar and having a tapered flange in its bottom, and an expansion nut engaging the screwthreaded end of the core and also the tapered flange of the cup and serving to clamp a hose section between itself and the longitudinal wall of the cup.

In testimony whereof I have hereunto set my hand this 15th day of December A. D. 1915.

GEORGE E. YOUNG.

Witnesses:
 WILSON H. PIERCE,
 HERBERT J. WILCOX.